March 23, 1971     C. KLEESATTEL     3,572,097
RESONANT SENSING DEVICES AND METHODS Filed May 7, 1968     2 Sheets-Sheet 1

INVENTOR
CLAUS KLEESATTEL

BY
ATTORNEY

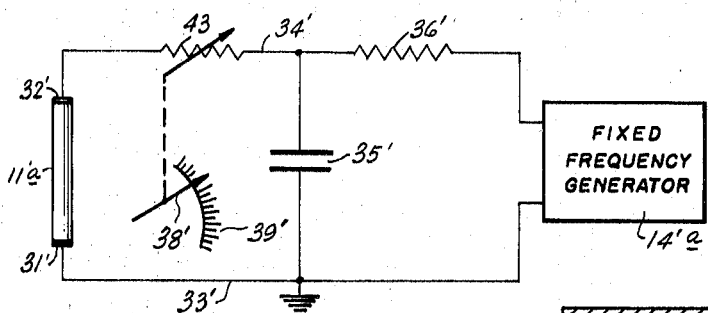
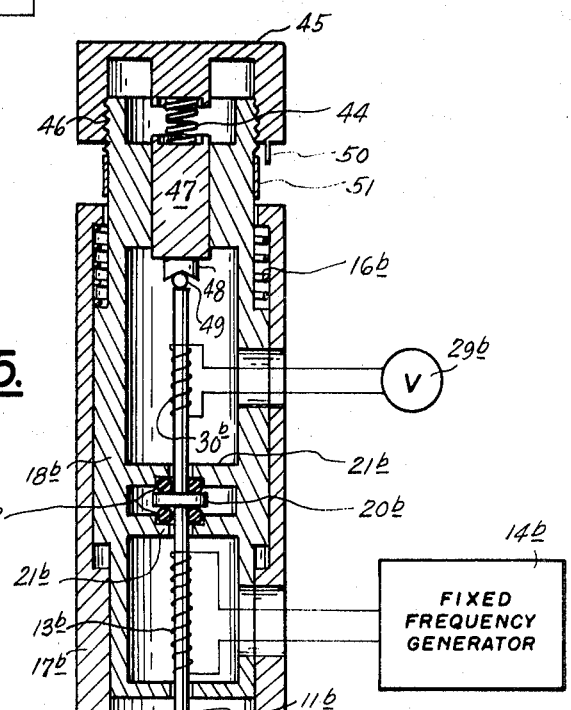
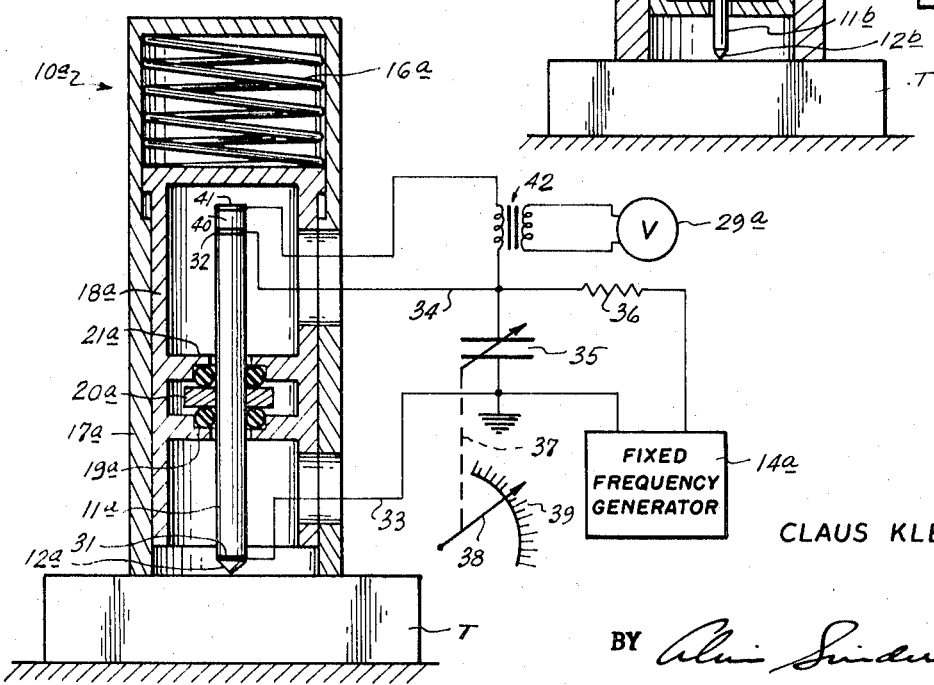

United States Patent Office 3,572,097
Patented Mar. 23, 1971

3,572,097
RESONANT SENSING DEVICES AND METHODS
Claud Kleesattel, 9841 64th Road,
Forest Hills, N.Y. 11374
Filed May 7, 1968, Ser. No. 727,169
Int. Cl. G01n 29/00
U.S. Cl. 73—67.2
17 Claims

ABSTRACT OF THE DISCLOSURE

In order to determine the surface properties of a test piece a fixed static force is applied to a mechanical resonating means for holding the latter in steady contact with the test piece at a contact surface shaped to provide increasing areas of contact with increasing penetration thereof into the test piece surface, the mechanical resonating means is vibrated at a fixed frequency and, while being thus held in steady contact with the test piece and vibrated, a characteristic or parameter of the mechanical resonating means which determines its resonance frequency is varied to achieve its resonance at the fixed frequency of vibration, with the variation of such characteristic or parameter required to achieve resonance being measured as an indication of the surface properties, such as hardness, of the test piece.

---

This invention relates generally to resonant sensing devices which can be used to determine or test the physical properties or characteristics of a test piece.

It has been disclosed in my U.S. Pat. No. 3,153,338, issued Oct. 20, 1964, to provide a resonant sensing device for indicating the surface properties, for example, hardness, of a test piece. Such known device comprises a mechanical resonating means having a hemispherical, conical, pyramidal or other contact surface to afford contact with a test piece over progressively increasing areas with increasing penetration of the contact surface into a surface of the test piece, electrically energized means for effecting vibration of the mechanical resonating means at a resonance frequency of the latter, and means exerting a static force for holding the contact surface of the vibrated mechanical resonating means in steady contact with the test piece so as to cause penetration into the surface of the latter to an extent dependent upon the surface characteristics of the test piece and the magnitude of the static force. Two basic modes of operating the above described device have been known.

In one of these modes of operation, a constant static force is used for maintaining the steady contact and a turnable generator is used for effecting vibration of the resonating means. When the resonance frequency of the mechanical resonating means is altered by reason of its steady contact with the test piece the generator frequency is varied until resonance is restored, and such variation of the generator frequency is measured as an indication of the mechanical contact impedance, and hence of the surface characteristics of the test piece.

In the other known mode of operating the described device, the frequency at which the mechanical resonating means is vibrated is fixed at a value different from the resonance frequency of the mechanical resonating means when in the free condition, and the static force by which the mechanical resonating means is held in steady contact with the test piece is progressively increased until resonance is achieved. In this mode of operation, the magnitude of the static contact force required to produce resonance is measured as an indication of the surface characteristics of the test piece.

It is an object of this invention to provide resonant sensing devices having desirable modes of operation different from those previously known for indicating the surface properties, such as hardness, of a test piece.

In accordance with an aspect of this invention, both the generator frequency and the static contact force are fixed, and any variation of the resonance frequency of the mechanical resonating means resulting from its contact with the test piece is cancelled or reversed by varying the free resonance frequency of the resonating means, that is, by varying a characteristic or parameter of the mechanical resonating means which determines its resonance frequency, with such variation of the characteristic or parameter being measured as an indication of the surface properties of the test piece.

Among the resonance frequency determining characteristics or parameters of the mechanical resonating means that may be varied according to this invention are an elastic modulus thereof, as by varying a magnetic polarizing field in the case where the mechanical resonating means includes a magnetostrictive rod or an electric polarizing field in the case where the mechanical resonating means includes a piezoelectric rod, or by varying the temperature of the mechanical resonating means. Further, where the mechanical resonating means includes an electromechanical transducer, its varied characteristic or parameter may be the coupling thereof to electrical circuits by which the transducer is energized from the fixed or constant frequency generator. The varied characteristic or parameter of the mechanical resonating means which determines its resonance frequency may also be its shape, mass distribution relative to its nodes and loops of vibration, or a force other than the static contact force which is applied to the mechanical resonating means remote from its contact surface to add elastic strain energy.

The above, and other objects, features and advantages of this invention, will be apparent in the following detailed description of illustrative embodiments which is to be read in connection with the accompanying drawings, in which:

FIG. 3 is a view similar to that of FIG. 1, but showing another embodiment of the invention;

FIG. 4 is a schematic representation of a modification of the embodiment shown on FIG. 3; and FIG. 5 is another view similar to that of FIG. 1, but showing still another embodiment of the invention.

Figure 1:
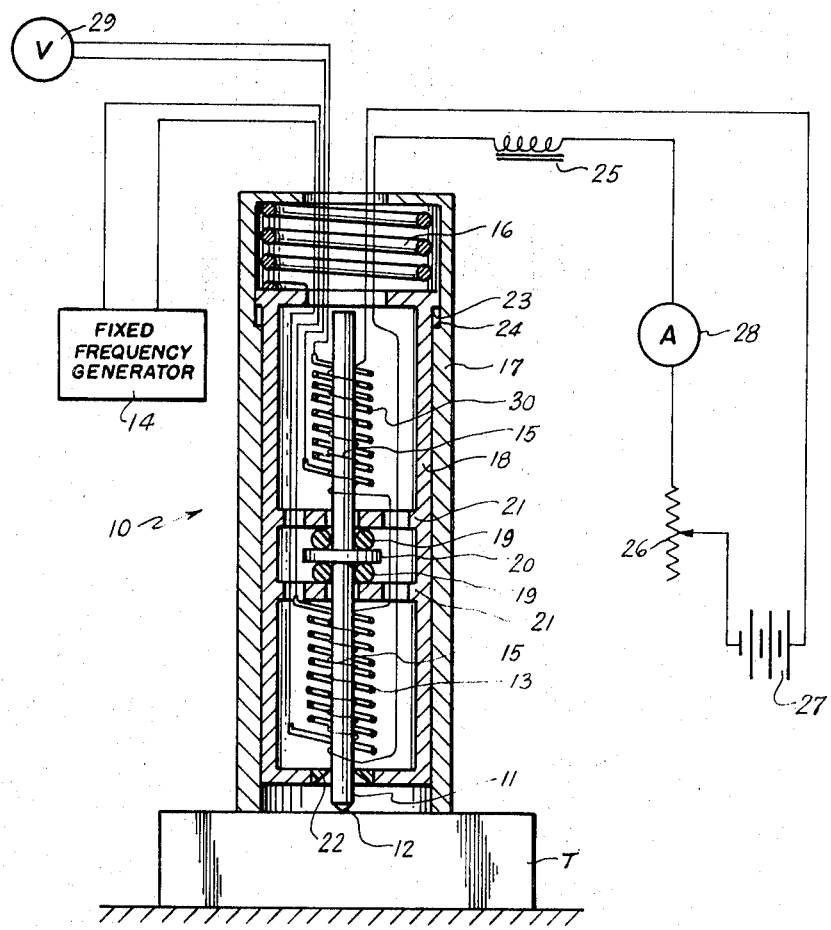
FIG. 1 is a schematic, axial sectional view of a resonant sensing device for indicating the surface properties of a test piece according to one embodiment of this invention.

Referring to the drawings in detail, and initially to FIG. 1 thereof, it will be seen that a sensing device embodying the present invention and there generally identified by the reference numeral 10 comprises mechanical resonating means shown to include a sensor in the form of an elongated rod 11 having a tip 12 at one end of diamond or other suitably hard material. Such tip 12 is shaped so that, when the tip is urged against a test piece T so as to penetrate the surface of the latter, the cross-sectional area of contact of tip 12 with the surface of test piece T increases progressively with increasing penetration of the test piece surface. Thus, the tip 12 may be of hemispherical, conical, pyramidal or other configuration for achieving the foregoing relationship of area of contact to extent of penetration.

Electro-mechanical means are provided for effecting longitudinal vibration of rod 11. In the device 10, as shown, such vibration of rod 11 is effected by forming the latter of a magnetostrictive material, for example, permanickel, nickel, permendur or other metals which have reasonably small band widths (high mechanical Q), so that the rod 11 will vibrate when subjected to the influence of an alternating electromagnetic field established by the supplying of a suitable alternating current to an energizing coil 13 from a generator 14 of electrical oscillations. The magnetostrictive rod 11 is polarized by the flow of a D.C. polarizing current through a polarizing coil 15.

The magnetostrictive rod 11 is dimensioned so that a node of its longitudinal vibrational movement occurs intermediate its ends. This condition is approximately satisfied by providing rod 11 with a length that is a whole multiple of one-half the wavelength of the compressional waves generated in the material of the magnetostrictive rod at the frequency of the alternating current supplied to energizing coil 13 from generator 14.

The tip 12 is conveniently held in steady contact with test piece T, that is, without separating from the latter or tapping as a result of the vibration of rod 11 by a static force acting longitudinally on rod 11 in the direction toward its tip 12 and which is sufficiently large to overcome the oppositely directed acceleration of tip 12 resulting from the longitudinal vibration of rod 11. As shown, such static force may be applied by a compression spring 16 acting between an outer housing 17 and an inner sleeve 18 which is slidable in the latter. The rod 11 is mounted within sleeve 18 by means of rubber rings 19 seating against opposite faces of a radial flange 20 provided on rod 11 at a nodal point of the rod and being constrained by inwardly directed radial flanges 21 on sleeve 18. The end of rod 11 carrying tip 12 projects axially from sleeve 18 and may be slidably centered relative thereto, as by a plastic bushing 22, and the axial movement of sleeve 18 relative to housing 17 by spring 16 may be limited by engageable shoulders 23 and 24 respectively formed thereon.

It will be apparent that, with the arrangement described above, tip 12 of rod 11 will project from housing 17 when rod 11 is in its free condition, that is, when spring 16 urges sleeve 18 relative to housing 17 to engage shoulders 23 and 24. However, when housing 17 is manually pressed against test piece T, as shown, sleeve 18 is longitudinally displaced relative to housing 17 against the force of spring 16 and the latter determines the static force with which tip 12 is held in steady contact with the test piece.

In accordance with this invention, the frequency of the alternating current fed to coil 13 from generator 14 is fixed and may be, for example, the resonance frequency of rod 11 when it is vibrated in the free condition. However, when the contact tip 12 is held in steady contact with test piece T by the static force of spring 16, which static force is also of fixed magnitude, there is a change in the resonance frequency of rod 11, that is, rod 11 is no longer resonant at the fixed frequency of the alternating current from generator 14.

In accordance with this invention, the change in the resonance frequency of rod 11 resulting from the steady contact of its tip 12 with the test piece is reversed or cancelled by suitably varying its free resonance frequency, as by varying a characteristic or parameter of the rod 11 which determines its resonance frequency, and the variation of such characteristic or parameter required to cancel the change in resonance frequency, that is, to restore the rod 11 to resonance at the fixed frequency of its vibration, is measured as an indication of the surface properties of the test piece with which it is held in steady contact by the fixed static force.

The characteristics or parameters of the mechanical resonating means that may be varied to cancel or reverse the change in resonance frequency resulting from the contact of tip 12 with the test piece are those characteristics which influence the mechanical impedance of the resonating means, among which is included the modulus of elasticity of rod 11. In the embodiment shown on FIG. 1, and in which rod 11 is of a magnetostrictive material, the modulus of elasticity of rod 11 may be varied by suitably varying the magnetic polarizing field of the magnetostrictive rod. In order to make possible such variation of the magnetic polarizing field, the polarizing coil 15, shown formed in two interconnected sections would about the portions of rod 11 divided by flange 20, is connected through an R.F. choke 25 and a variable resistor 26 with a D.C. source 27. Thus, by varying the effective value of resistor 26, the D.C. current flowing through polarizing coil 15 can be changed to correspondingly change the strength of the magnetic polarizing field. An ammeter 28 is also provided in the energizing circuit for polarizing coil 15 to measure the current flowing through the latter and such ammeter may be provided with a scale which is calibrated to directly indicate the hardness or other surface properties of a test piece.

By was of example, it may be noted that, in the case of a magnetostrictive rod 11 formed of an alloy consisting of 96% nickel and 4% cobalt, and assuming that the field vector and strain vector have the same direction and that the induction B of the magnetic polarizing field is uniform throughout the material of the rod, a change in such induction B from 0 to 3800 gauss will effect a change in the elastic modulus E of the rod from $1.50 \times 10^{12}$ dyne/cm.$^2$ to $2.02 \times 10^{12}$ dyne/cm.$^2$. Thus, a 35% increase in the elastic modulus can be obtained which increases the sound velocity in rod 11 by 16% and consequently raises the resonance frequency by a similar amount, for example, from 20,000 c./s. to 23,200 c./s.

Figure 2:
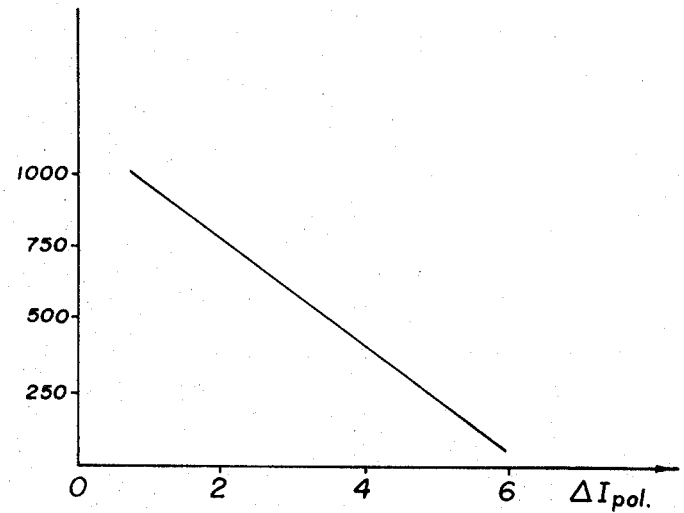
FIG. 2 is a graphical representation of the approximate relationship between a change in polarizing current indicated with the device of FIG. 1 and the hardness of a measured test piece.

By way of illustrating the use of the above described device 10, it will be assumed that rod 11 is designed to have a resonance frequency of 20,000 c./s. when the polarizing current $I_{pol}$ indicated by meter 28 is 5 amperes. In such case, generator 14 is designed or adjusted so that its alternating current output fed to energizing coil 13 has a fixed frequency of 20,000 c./s., whereby rod 11 is resonant when its tip 12 is free. The fact that rod 11 is resonant may be indicated by a voltmeter 29 connected with a pick-up coil 30 wound about rod 11 so to have a voltage induced in coil 30 in response to vibration of the magnetostrictive rod. Such induced voltage, as indicated by meter 29 is proportional to the amplitude of vibration and is at a maximum during resonance. The housing 17 is now pressed against test piece T so that spring 16 applies a fixed static force holding tip 12 of rod 11 in steady contact with the test piece. By reason of such steady contact of tip 12 with test piece T, rod 11 has a new resonance frequency, for example, of 21,000 c./s. Since generator 14 continues to oscillate at 20,000 c./s., rod 11 is out of resonance, as is indicated by a decrease in the voltage sensed by meter 29. Now, resistor 26 is manipulated to decrease the polarizing current $I_{pol}$, for example, to a value of 3 amperes, at which value of polarizing current the rod 11 is again resonant as indicated by an increase in the reading on meter 29. The decrease in polarizing current $\Delta I_{pol}$ required to restore the rod to resonance is a function of the area of contact of tip 12 with the test piece. For a given static force, the larger the value of $\Delta I_{pol}$ required to restore resonance of rod 11, the softer is the test piece, as is represented schematically on FIG. 2 which approximately plots the relationship between hardness of the test piece (on the Vickers hardness scale) and change in polarizing current ($\Delta I_{pol}$) required to restore rod 11 to resonance at the fixed frequency.

Of course, other means may be employed for varying the elastic modulus of rod 11 so as to restore the latter to resonance at the fixed frequency of the oscillations supplied by generator 14. Thus, for example, the elastic modulus of rod 11 may be varied by suitably changing its temperature, in which case the temperature change required to restore resonance of rod 11 upon contact of tip 12 with the test piece is measured as an indication of the hardness or other surface properties of the test piece.

Further, if the rod 11 is of a piezo-electric material, its elastic modulus may be varied for the indicated purpose by varying an electric polarizing field, and in this case the change in polarizing voltage required to restore resonance when the rod is in contact with the test piece may again be measured as an indication of the hardness of the test piece.

When the mechanical resonating means ihcludes an electro-mechanical transducer the resonance frequency of the latter may be varied, so as to cancel or reverse the change in resonance frequency that results from contact with the test piece, by varying the electromechanical coupling between the transducer and the energizing circuits. The connection of circuit elements in parallel with the transducer alters the so-called antiresonance frequency of the transducer. The foregoing is particularly efficacious when the electromechanical transducer is a piezo-electric ceramic such as, PTZ–4, having a very high coupling factor $k$, for example, of 0.6. The maximum frequency variation that can be obtained is expressed by the equation:

$$\frac{f_r}{f_a} = \sqrt{1-k^2}$$

where $f_r$ is the low impedance resonance frequency of the piezo-electric ceramic and $f_a$ is the highest antiresonance or high-impedance resonance frequency. With $k=0.6$, the above gives a maximum ratio of $f_r/f_a=0.8$, or $f_a=1.25f_r$, which is of sufficient magnitude for the intended purpose.

The antiresonance can be varied by varying a capacitor that is connected across the electrodes of the piezo-electric ceramic transducer. Thus, as shown on FIG. 3, a device 10a according to this invention, in which the several parts are identified by the same reference numerals applied to the similar parts on FIG. 1, but with the letter "a" appended thereto, comprises a rod 11a of piezo-electric ceramic, for example, of PZT-4 which is a compound of lead zirconate and lead titanate, having electrodes 31 and 32 bonded to its opposite ends by means of a hard adhesive or cement such as, a cured epoxy cement. A contact tip 12a is similarly bonded to electrode 31 so as to extend from the adjacent end of rod 11a, and a grounded conductor 33 and a conductor 34 extend to electrodes 31 and 32, respectively from the generator 14a of electrical oscillations at a fixed or constant frequency. Such constant frequency is selected so that the electrical oscillations supplied by generator 14a cause longitudinal vibration of rod 11a at a resonance frequency thereof when tip 12a is in its free condition. Further, rod 11a is dimensioned so that a node of its longitudinal vibrational movement occurs intermediate its ends.

As in the previously described embodiment, tip 12a may be conveniently held in steady contact with a test piece T by the static force exerted by a spring 16a acting between an outer housing 17a and an inner sleeve 18a in which rod 11a is mounted by means of rubber rings 19a seated between a radial flange 20a bonded to rod 11a at a nodal point and inwardly directed radial flanges 21a on sleeve 18a. When housing 17a is manually or otherwise pressed against test piece T, as shown, spring 16a applies a fixed or constant force through sleeve 18a and rod 11a to hold tip 12a in steady contact with the test piece and thus to penetrate the surface of the latter to an extent determined by the surface properties, such as hardness, of the test piece. By reason of the contour of tip 12a, the area of contact thereof with tést piece T under the constant static force is determined by the hardness of the test piece. Thus, upon contact of tip 12a with test piece T, there is a change in the resonance frequency of rod 11a, that is, rod 11a is no longer resonant at the fixed frequency of the alternating current or oscillations supplied by generator 14a.

In accordance with this invention, such change in the resonance frequency of rod 11a resulting from contact of its tip 12a with the test piece is cancelled or reversed by adjusting a variable capacitor 35 which is connected between conductors 33 and 34 so as to be in parallel with the piezo-electric transducer rod 11a and thus capable of altering the antiresonance frequency of the latter. Preferably, as shown, a resistor 36 is interposed in conductor 34, that is, in the "hot" line, for eliminating any influence the impedance of generator 14a may have on the resonance frequency of the transducer. The tuning or movable element of variable capacitor 35 is connected, as represented at 37, to an indicator 38 similarly movable relative to a scale 39 which may be calibrated to directly indicate hardness values.

In order to indicate when piezo-electric rod 11a is resonant, device 10a includes a pick-up crystal 40, for example, of a piezo-electric ceramic such as PZT–5 which is also a compound of lead zirconate and lead titanate. The pick-up crystal 40 is bonded at one side, as by a cured epoxy cement, to electrode 32 and has an electrode 41 similarly bonded to its other side. A voltage proportional to the amplitude of vibration of rod 11a, and hence having a maximum value when rod 11a is resonant, is produced across electrodes 32 and 41 in response to vibration of crystal 40 with rod 11a. Such voltage is applied to the primary winding of a transformer 42, and the secondary winding of the latter is connected to a voltmeter 29a for indicating the resonance condition.

In using the device 10a, capacitor 35 is initially set at a low value of capacitance and the fixed frequency of generator 14a is selected so that rod 11a is resonant at its antiresonance frequency with tip 12a in the free condition. When tip 12a is held against test piece T by the fixed force exerted by spring 16a, the resonance frequency of rod 11a rises, that is, rod 11a is no longer resonant at the fixed frequency of generator 14a. In order to cancel the change in resonance frequency, capacitor 35 is adjusted in the direction for higher capacitance values until meter 29a again indicates a maximum voltage produced by pick-up crystal 40, that is, a restoration of resonance. The change in capacitance required to restore resonance indicates the area of contact of tip 12a with the test piece and may be indicated in terms of hardness or other surface properties by the scale 39.

Referring now to FIG. 4, it will be seen that, in a modification of the device described above with reference to FIG. 3, the change in resonance frequency of the piezo-electric transducer rod 11'a resulting from contact with the test piece is cancelled or reversed by adjustment of a variable resistor 43 interposed in series with the operation resistor 36' in the conductor 34' or "hot" line extending from generator 14'a to electrode 32' of the rod. The slider or movable element of variable resistor 43 is connected, as at 37', to the indicator 38' which cooperates with the scale 39' calibrated to indicate hardness of the test piece. A fixed capacitor 35' having a capacitance value substantially larger than the capacitance of the transducer rod 11'a is connected between conductor 34', at a junction intermediate resistors 36' and 43, and the grounded conductor 33' extending from generator 14'a and electrode 31'.

With the arrangement of FIG. 4, increasing the resistance value of variable resistor 43 serves to increase the resonance frequency of red 11'a. Thus, in using this arrangement, the variable resistor 43 is initially set for a relatively high resistance value, and the frequency of oscillations from generator 14'a is set to be at the antiresonance frequency of rod 11'a for such setting of resistor 43 and with the contact tip of rod 11'a in its free condition. When such tip is contacted with the test piece by a fixed static force, the resonance frequency of rod 11'a rises and such increase of the resonance frequency is cancelled or reversed by adjusting resistor 43 to decrease its resistance value until the resonance frequency of rod 11'a is reduced to the frequency of generator 14'a.

The extent of such adjustment is indicated by indicator 38' and scale 39' in terms of the hardness of the measured test piece.

Referring now to FIG. 5, it will be seen that the resonant sensing device 10b for determining surface properties, such as hardness, of a test piece in accordance with this invention has its several parts identified by the same reference numerals that refer to similar parts of the embodiment of FIG. 1, but with the letter "b" appended thereto. In the device 10b, the rod 11b of magnetostrictive material is made to vibrate longitudinally by alternating current or oscillations supplied, at a fixed or constant frequency, to an energizing coil 13b from the generator 14b, and the rod 11b is dimensioned so as to have a node of its longitudinal vibrational movement located intermediate its ends.

Tip 12b is adapted to be conveniently held in steady contact with a test piece T by the fixed or constant static force exerted by a spring 16b acting between an outer housing 17b and an inner sleeve 18b in which rod 11b is mounted by means of rubber rings 19b seated between a flange 20b on the rod at a nodal point and inwardly directed flanges 21b of sleeve 18b. When housing 17b is pressed against the test piece, as shown, the static force exerted by spring 16b causes tip 12b to indent the test piece surface to an extent determined by the hardness of such surface. By reason of the contour of tip 12b, the area of contact thus established between rod tip 12b and the test piece is dependent upon the hardness of the latter.

Thus, if the fixed frequency of the oscillations from generator 14b is selected to correspond to the resonance frequency of rod 11b when tip 12b is in the free condition, the steady contact of tip 12b with the test piece will change the resonance frequency of rod 11b so that the latter no longer is resonant at the fixed frequency of generator 14b, as will be made apparent by a drop in the voltage indicated by the voltmeter 29b connected with the pick-up coil 30b.

In accordance with this invention, such change in the resonance frequency of rod 11b resulting from contact of its tip 12b with test piece T is cancelled or reversed, while maintaining the fixed static force and exciting frequency, by varying a second contact force that is applied to rod 11b to add elastic strain energy thereto without affecting the static force by which tip 12b is held in contact with the test piece. In the device 10b, as shown, such force to be varied for cancelling the change in resonance frequency is applied at the end of rod 11b remote from tip 12b by a spring 44 interposed between a knob 45 threaded on sleeve 18b, as at 46, and a plunger 47 which is longitudinally slidable in sleeve 18b and carries a seat 48 of hard material engaging a tungsten carbide or sapphire ball 49 cemented to the end of rod 11b remote from tip 12b. It will be apparent that rotation of knob 45 relative to sleeve 18b will vary the compression of spring 44 and thereby vary the force of such spring applied at seat 48 to ball 49 for adding or subtracting elastic strain energy at a boundary of rod 11b. The adjustable force that can be exerted by spring 44 is limited so that only fully reversible elastic deformation may take place at the contacting surfaces of seat 48 and ball 49. Adjusting the force of spring 44 has the effect of varying the impedance of the mechanical resonating means and thereby varies the resonance frequency of the latter while the frequency of generator 14b and the force of spring 16b holding tip 12b in contact with the test piece remain fixed.

In using the device 10b, and with tip 12b in its free condition, knob 45 is turned in the direction to increase the force exerted by spring 44 until rod 11b is resonant at the frequency of generator 14b. The position of knob 45 is then noted by the relationship of an index 50 extending therefrom to a scale 51 on sleeve 18b. Thereafter, housing 17b is pressed against the test piece to contact tip 12b with the latter and the resulting change in the resonance frequency of rod 11b is cancelled by turning knob 45 in the direction to reduce the force of spring 44 until resonance is restored as indicated by a maximum voltage shown on meter 29b. The new position of knob 45 is noted by means of index 50 and scale 51, and the difference between the new and initial positions of the knob is an indication of the change in force required to restore resonance and hence of the hardness of the test piece. As is apparent, the scale 51 can be calibrated to directly indicate the hardness values or other surface properties of the measured test piece.

In the above described embodiments of the invention, the adjustments, for example, of polarizing current (FIG. 1), of capacitance (FIG. 3), of resistance (FIG. 4) or of added elastic strain energy (FIG. 5), for cancelling the change in resonance frequency resulting from contact with the test piece have been manually effected. However, it will be apparent that readily available existing arrangements may be provided to automatically effect such adjustments in the direction to maintain a maximum voltage output from the pick-up coil or crystal.

It will be understood that in all of the described embodiments of the invention, the change in resonance frequency of the mechanical resonating means that results from contact of its tip with the test piece is cancelled or reversed by varying the effective impedance of the resonating means while the exciting frequency and the static force holding the tip in contact with the test piece remain fixed. Of course, other arrangements may be provided to vary the impedance for the stated purpose. Thus, for example, in the device 10b of FIG. 5, the spring 44 and associated structure for applying a force to the end of rod 11b remote from tip 12b may be replaced by a mass (not shown) which is attached to the vibrated rod so as to be adjustable therealong. Adjustment of such a mass so as to move closer to a nodal point increases the resonance frequency and, conversely, movement of the mass closer to a loop of the longitudinal vibrational movement serves to reduce the resonance frequency. Another replacement for the spring 44 and associated structure of device 10b may be an arrangement for coupling a column of mercury of variable height to the end of rod 11b remote from its tip 12b. Increasing the height of the mercury column decreases the resonance frequency and decreasing the height of the mercury column increases the resonance frequency.

Still another means for cancelling or reversing the change in resonance frequency that results from contact of the tip with the test piece may consist in structure to elastically deform the vibrated resonating member so as to vary the shape thereof while the static contact force and the exciting frequency remain unchanged.

Although several embodiments of the invention have been described in detail herein with reference to the accompanying drawings and mention has been made of various modifications thereof, it is to be understood that the invention is not limited to such precise embodiments and modifications, and that various changes and further modifications may be effected therein by one skilled in the art without departing from the scope or spirit of the invention as defined in the appended claims.

What is claimed is:

1. The method of determining the surface properties of a test piece comprising vibrating a mechanical resonating means at a fixed frequency, holding the vibrated mechanical resonating means against the test piece with a fixed static force sufficient to obtain steady contact with the test piece at a contact surface shaped to provide increasing areas of contact for increasing penetration of the shaped contact surface into the test piece surface, varying a parameter of the resonance frequency of said mechanical resonating means so as to achieve resonance of said mechanical resonating means at said fixed frequency of its vibration while being held in said steady contact with the test piece by said fixed static force, and measuring the extent to which said parameter is varied to achieve said resonance as an indication of the surface properties of said test piece.

2. The method according to claim 1, in which said fixed frequency is selected to be the resonance frequency of said mechanical resonating means when said contact surface is free of the test piece.

3. The method according to claim 1, in which said mechanical resonating means includes an electromechanical transducer, and said parameter which is varied is a polarizing field for said transducer.

4. The method according to claim 1, in which said mechanical resonating means includes an electro-mechanical transducer and electrical circuit means for energizing said transducer, and said parameter which is varied is the electro-mechanical coupling of said transducer with said electrical circuit means.

5. The method according to claim 1, in which said parameter which is varied is the elastic modulus of said mechanical resonating means.

6. The method according to claim 1, in which the parameter which is varied while said static force and frequency of vibration remain fixed is the mechanical impedance of said mechanical resonating means.

7. The method according to claim 1, in which said parameter is varied by changing the magnitude of a second contact force applied to said mechanical resonating means at a location remote from said contact surface while maintaining unchanged said fixed static force with which said mechanical resonating means is held in steady contact with the test piece.

8. A resonant sensing device for indicating the surface properties of a test piece, comprising mechanical resonating means having a contact surface shaped to contact a test piece at progressively increasing areas of contact with increasing penetration of said contact surface into the test piece, means to effect vibration of said resonating means at a fixed frequency, means to exert a fixed static force on said resonating means for holding said contact surface in steady contact with the test piece during said vibration of the resonating means and to cause said penetration into the test piece to an extent dependent upon the surface properties of the test piece, means to vary a parameter of the resonance frequency of said mechanical resonating means so as to achieve resonance of said mechanical resonating means at said fixed frequency while said contact surface is held in steady contact with the test piece by said fixed static force, and means indicating the etxent to which said parameter is varied to achieve said resonance as a measure of said surface properties of the test piece.

9. A resonant sensing device according to claim 8, in which said fixed frequency of vibration is selected to correspond to the resonance freqeuncy of said mechanical resonating means with said contact surface thereof in free condition.

10. A resonant sensing device according to claim 8, in which said mechanical resonating means includes an electro-mechanical transducer, and said means to vary a parameter of said resonating means is effective to change the effective elastic modulus of said transducer.

11. A resonant sensing device according to claim 10, in which said means to change the elastic modulus of said transducer includes means to establish a polarizing field for the transducer, and means to vary the strength of said field.

12. A resonant sensing device according to claim 10, in which said means to effect vibration of said resonating means includes electric circuit means to supply oscillations to said transducer at said fixed frequency, and said means to change the effective elastic modulus of said transducer includes electrical element means adjustable to vary the electro-mechanical coupling of said transducer with said circuit means.

13. A resonant sensing device according to claim 12, in which said transducer is of piezo-electric material and said adjustable electrical element controls the antiresonance frequency of said piezo-electric transducer.

14. A resonant sensing device according to claim 13, in which said adjustable electrical element is a variable capacitor in parallel with said piezo-electric transducer.

15. A resonant sensing device according to claim 13, in which said adjustable electrical element is a variable resistor in series with said piezo-electric transducer, and a capacitor of substantially greater capacitance than said transducer is connected in parallel with said series connected variable resistor and transducer.

16. A resonant sensing device according to claim 8, in which said means to vary a parameter of the resonance frequency of the mechanical resonating means includes adjustable means to apply a selectivity varied force to said resonating means at a location remote from said contact surface while maintaining unchanged said fixed static force with which said mechanical resonating means is held in contact with the test piece.

17. A resonant sensing device according to claim 16, in which said mechanical resonating means includes an elongated, longitudinally vibrated rod dimensioned to have a plurality of loops of its longitudinal vibrational movement at least one of which loops is located at one end thereof, said contact surface is disposed at said one end of the rod, and said adjustable means to apply a selectively varied second contact force acts upon said rod at another of said loops of the longitudinal vibrational movement thereof.

References Cited
UNITED STATES PATENTS

| 3,153,338 | 10/1964 | Kleesattel | 73—67.1 |
| 3,307,393 | 3/1967 | Kessler | 73—67.1 |
| 3,472,063 | 10/1969 | Branson | 73—67.1 |

RICHARD C. QUEISSER, Primary Examiner

A. E. KORKOSZ, Assistant Examiner

U.S. Cl. X.R.
73—67.1, 81